United States Patent
Kwon (10) Patent No.: US 7,647,174 B2
(45) Date of Patent: Jan. 12, 2010

(54) NAVIGATION SYSTEM WITH FUNCTION OF ONE-TOUCH MAP MATCHING CORRECTION AND METHOD THEREOF

(75) Inventor: Pil Su Kwon, Icheon-shi (KR)

(73) Assignee: Hyundai Autonet Co., Ltd., Icheon-Shi, Kyungki-Do (KR)

( * ) Notice: Subject to any disclaimer, the term of this patent is extended or adjusted under 35 U.S.C. 154(b) by 610 days.

(21) Appl. No.: 11/279,966

(22) Filed: Apr. 17, 2006

(65) Prior Publication Data

US 2006/0276961 A1 Dec. 7, 2006

(30) Foreign Application Priority Data

Jun. 1, 2005 (KR) ...................... 10-2005-0046808

(51) Int. Cl.
*G01C 21/00* (2006.01)

(52) U.S. Cl. ........................ 701/214; 701/200; 701/207; 701/208; 701/209; 701/210; 701/211; 701/212; 701/213; 340/955; 340/990; 340/995.1; 340/995.11; 340/995.14; 340/995.15; 340/995.17; 340/995.18; 340/995.19; 340/995.22; 340/995.25; 340/995.26; 340/995.27; 342/357.01; 342/357.02; 342/357.03; 342/357.06; 342/357.08; 342/457; 353/12

(58) Field of Classification Search ................. 701/200, 701/207, 208, 209, 210, 211, 212, 213, 214; 340/988, 990, 995.1, 995.11, 995.14, 995.15, 340/995.17, 995.18, 995.19, 995.22, 995.25, 340/995.26, 995.27; 342/357.01, 357.02, 342/357.03, 357.06, 357.08, 457; 353/12
See application file for complete search history.

(56) References Cited

U.S. PATENT DOCUMENTS 5,459,667 A * 10/1995 Odagaki et al. ............. 701/209
6,173,232 B1 * 1/2001 Nanba et al. ................ 701/209
6,429,812 B1 * 8/2002 Hoffberg ................. 342/357.1
6,466,866 B1 * 10/2002 Sato ........................... 701/209
6,662,101 B2 * 12/2003 Adachi ....................... 701/201
6,920,392 B2 * 7/2005 Adachi ....................... 701/208
6,931,319 B2 * 8/2005 Adachi ....................... 701/208
7,398,155 B2 * 7/2008 Ichida ........................ 701/208
2003/0109984 A1 * 6/2003 Adachi ....................... 701/208

(Continued)

FOREIGN PATENT DOCUMENTS

JP 10-177337 3/1998

(Continued)

*Primary Examiner*—Khoi Tran
*Assistant Examiner*—Nikhil Sriraman
(74) *Attorney, Agent, or Firm*—IPLA P.A.; James E. Bame (57) ABSTRACT

A navigation system with a function of one-touch map matching correction, and a method thereof. The navigation system includes a GPS module for receiving each position signal, and measuring self position and driving direction; a map database for storing map data; a storage unit for storing a candidate designation index, road information, a guidance stop flag, a flag activating a map-matching correction button, and voice data for road sequence guidance; a display unit for displaying the map data, activating or deactivating the map-matching correction button, and generating a coordinate value of a position; and a controller for indexing the parallel roads, generating a candidate road array, activating the map-matching correction button, and sequentially selecting candidate roads while performing the map matching correction.

10 Claims, 7 Drawing Sheets

U.S. PATENT DOCUMENTS

| | | | |
|---|---|---|---|
| 2003/0154019 A1* | 8/2003 | Adachi et al. | 701/200 |
| 2005/0131632 A1* | 6/2005 | Adachi | 701/200 |
| 2005/0222758 A1* | 10/2005 | Ichida | 701/208 |
| 2005/0228584 A1* | 10/2005 | Adachi et al. | 701/208 |
| 2006/0241858 A1* | 10/2006 | Adachi | 701/207 |
| 2007/0150181 A1* | 6/2007 | Adachi | 701/208 |
| 2008/0077322 A1* | 3/2008 | Sumizawa | 701/210 |

FOREIGN PATENT DOCUMENTS

| | | |
|---|---|---|
| JP | 11-1845375 | 7/1999 |
| JP | 2002-288194 | 10/2002 |
| KR | 1020030033853 | 5/2003 |
| KR | 1020040020991 | 3/2004 |
| KR | 1020040020994 | 3/2004 |
| KR | 1020040048485 | 6/2004 |

* cited by examiner

NAVIGATION SYSTEM WITH FUNCTION OF ONE-TOUCH MAP MATCHING CORRECTION AND METHOD THEREOF

BACKGROUND OF THE INVENTION

1. Field of the Invention

The present invention relates to a navigation system, and more particularly, to a navigation system with a function of one-touch map matching correction, for performing one-touch map matching correction when there exist a plurality of parallel roads within a predetermined distance from a road of a current position, and a method thereof.

2. Description of the Related Art

In general, in a navigation system, a path from a current position to a destination inputted by a user on the basis of a global positioning system (GPS) is selected by a path selection method predefined by the user, and road guidance based on the selected path is performed.

In detail, the navigation system includes a map database for storing map data, which is obtained by mapping information on a national terrain, a road on the terrain, a building and a terrain around the road, and names and addresses of the road and the buildings, according to a latitude and a longitude so as to perform the road guidance; and a GPS module for receiving respective position signals from a plurality of GPS satellites, and calculating a self position, an latitude, and a longitude using the received position signals. The navigation system receives the self position from the GPS module, matches the received position to a corresponding position of the map data, and performs the road guidance on the basis of the preset path.

In general, when the self position of the GPS module is calculated using the position signals received from the GPS satellites, it gets to be in error by tens of meters. Accordingly, in case where a mark is displayed at the calculated position as it is, the displayed mark can be out of the road of the map data where the user is under driving.

In order to correct such an error, the conventional navigation system employs a map matching (MM) method. In the MM method, if the calculated self position is determined to be out of the road of the map data, the out-of position is forcibly moved to its closest road of the map data for correction.

However, in case where the correction using the MM method is performed in an area where a plurality of roads are arrayed to be in parallel with the road on which the user is under driving, erroneous map matching to neighboring roads other than an actual road can occur.

In case where the calculated position is matched to the road in the conventional MM method as described above, erroneous path search and guidance for the roads other than the road where the user is being advanced by car or on foot occur. Therefore, there is a drawback in that the user can be confused by unwanted path search and guidance.

SUMMARY OF THE INVENTION

Accordingly, the present invention is directed to a navigation system with a function of one-touch map matching correction and a method thereof that substantially overcome one or more of the limitations and disadvantages of the conventional art.

One object of the present invention is to provide a navigation system with a function of one-touch map matching correction, for performing one-touch map matching correction when there exist a plurality of parallel roads within a predetermined distance from a road of a current position, and a method thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims as well as the appended drawings.

To achieve the above and other objects and advantages, and in accordance with the purpose of the invention, as embodied and broadly described herein, there is provided a navigation system with a function of map matching correction, for matching self position and driving direction to map data and displaying the map-matched position and direction, the system including: a GPS module for receiving each position signal from a plurality of GPS satellites, measuring the self position and driving direction, and outputting information on the measured position and direction; a map database for storing the map data; a storage unit for storing a candidate designation index, road information corresponding to the candidate designation index, a guidance stop flag, a flag activating a map-matching correction button, and voice data for road sequence guidance; a display unit for, under a predetermined control, displaying the map data, activating or deactivating the map-matching correction button, magnifying and displaying candidate roads, and generating a coordinate value of a position on a screen pressed by an external force; and a controller for, when there are one or more parallel roads within a predetermined distance from a road of the map-matched position, indexing the parallel roads, generating a candidate road array for storing information on roads including a road of the map-matched position according to an indexing sequence, activating the map-matching correction button, and sequentially selecting candidate roads of the candidate road array depending on the number of times of pressing the map-matching correction button while performing the map matching correction.

In another aspect of the present invention, there is provided a navigation system with a function of map matching correction, for matching self position and driving direction to map data and displaying the map-matched position and direction, the system including: a GPS module for receiving each position signal from a plurality of GPS satellites, measuring the self position and driving direction, and outputting information on the measured position and direction; a map database for storing the map data; a storage unit for storing a candidate designation index, road information corresponding to the candidate designation index, a guidance stop flag, a flag activating a map-matching correction button, and voice data for road sequence guidance; a display unit for, under a predetermined control, displaying the map data, activating or deactivating the map-matching correction button, magnifying and displaying candidate roads, and generating a coordinate value of a position on a screen pressed by an external force; and a controller for, when there are one or more parallel roads within a predetermined distance from a road of the map-matched position, indexing the parallel roads, generating in the storage unit a candidate road array for storing information on roads including a road of the map-matched position according to an indexing sequence, activating the map-matching correction button, and when the map-matching correction button is pressed, displaying the candidate roads on the display unit, receiving a coordinate value of one of the displayed candidate roads pressed by a user from the display unit, and performing the map matching correction.

In a further another aspect of the present invention, there is provided a method of correcting map matching in a navigation system having a function of map matching correction, the method including the steps of: measuring a current position and, when there are one or more parallel roads within a predetermined distance from a road of the measured position, preparing an array for storing indexes for and information on the road of the measured position and the parallel roads and corresponding to the stored indexes, and activating a map-matching correction button; and sequentially moving the roads according to an indexing sequence by the number of times of pressing the map-matching correction button, while performing the map matching correction.

In a still another aspect of the present invention, there is provided a method of correcting map matching in a navigation system having a function of map matching correction, the method including the steps of: measuring a current position and, when there are one or more parallel roads within a predetermined distance from a road of the measured position, preparing a candidate road array for storing indexes for and information on the road of the measured position and the parallel roads and corresponding to the stored indexes, and activating a map-matching correction button; and when the map-matching correction button is pressed, displaying candidate roads, and performing the map matching correction for the candidate road selected by a user from the displayed candidate roads.

It is to be understood that both the foregoing summary and the following detailed description of the present invention are merely exemplary and intended for explanatory purposes only.

BRIEF DESCRIPTION OF THE DRAWINGS

The accompanying drawings, which are included to aid in understanding the invention and are incorporated into and constitute a part of this application, illustrate embodiment(s) of the invention and together with the description serve to explain the principles of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numerals will be used throughout the drawings to refer to the same or like parts.

According to the present invention, it is determined whether or not there exist a plurality of roads arrayed to be in parallel and be spaced apart within a predetermined distance at a calculated current position, a button for correcting map matching (Hereinafter, referred to as "map-matching correction button") is activated on a display device when there exist the plurality of roads, and a user presses the activated map-matching correction button, thereby executing map matching correction.

In the first embodiment of the present invention, the activated map-matching correction button is repeatedly pressed, thereby sequentially changing the plurality of roads at one side and at a right angle with a driving direction in consideration of a shape of a road line while performing the map matching corrections. In other words, the map matching correction refers to a self position correction.

In the second embodiment of the present invention, if a map-matching correction button is activated and then, pressed, a plurality of roads arrayed to be in parallel are magnified and displayed on a display device, and map matching correction is performed for a road selected by a user from the displayed roads.

Hereinafter, a navigation system with a function of one-touch map matching correction and a method thereof according to the present invention will be described with reference to the attached drawings.

Figure 1:
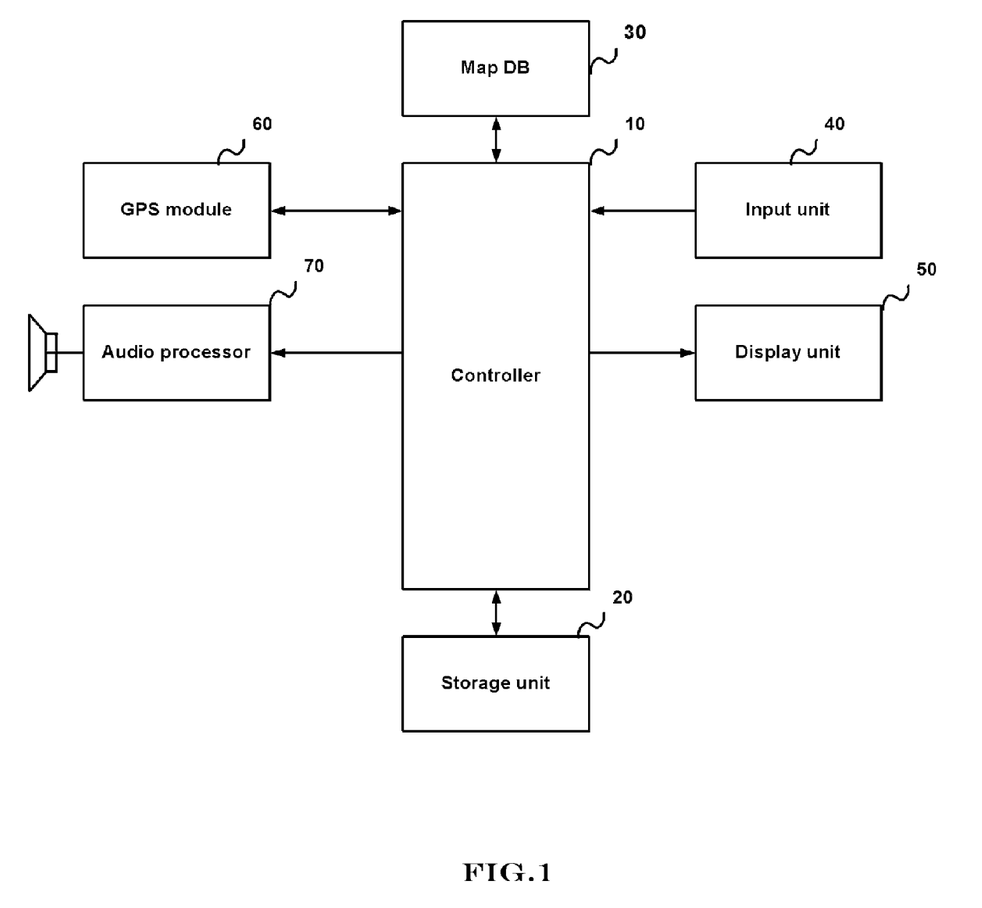
FIG. 1 is a block diagram illustrating a navigation system with a function of one-touch map matching correction according to the present invention.

FIG. 1 is a block diagram illustrating the navigation system with the function of one-touch map matching correction according to the present invention.

The navigation system includes a controller 10, a storage unit 20, a map database (DB) 30, an input unit 40, a display unit 50, a GPS module 60, and an audio processor 70.

The controller 10 controls a general operation of the navigation system according to the present invention.

The storage unit 20 includes a region for storing a control program for controlling the navigation system, a region for temporarily storing data generated in execution of the control program, such as a candidate designation index and road information corresponding to the candidate designation index, and a region for storing various setting values such as a guidance stop flag, a registration destination, and voice data on road sequence guidance.

The map DB 30 stores map data including a terrain, the road, facilities based on a latitude and a longitude, and a name and a parcel number corresponding to each of the terrain, the road, and the facilities.

The input unit 40 being a key input unit includes a plurality of keys for selecting or inputting a function and a destination of the navigation system, generating key data corresponding to the key pressed by the user, and outputting the generated key data to the controller 10.

The display unit 50 being a liquid crystal display (LCD) displays operation state information and the map data of the navigation system under the control of the controller 10. Further, the display unit 50 can also employ a touch screen.

The GPS module 60 includes a GPS receiver and a gyro sensor. The GPS module 60 receives each position signal from a plurality of GPS satellites through the GPS receiver, calculates the self position from the position signal, measures the driving direction through the gyro sensor, and outputs information on the self position and the driving direction to the controller 10.

The audio processor 70 receives voice data, converts the received voice data into an analogue audio signal, and outputs the analogue audio signal by an audible sound through a speaker. The voice data can be general voice data for road guidance, and the voice data for road sequence guidance such as "Map matching correction for a 1-numbered road is performed".

Figure 2:
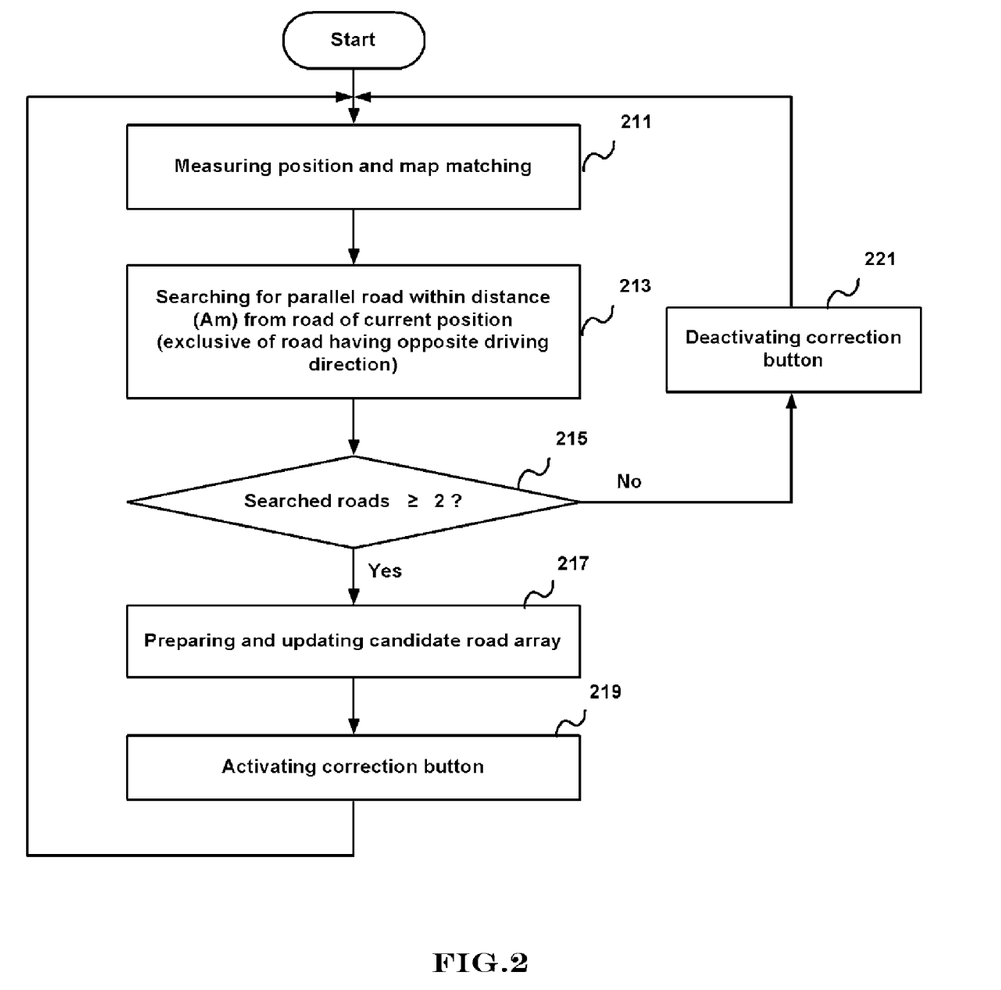
FIG. 2 is a flowchart illustrating a method for activating a map-matching correction button according to the present invention.
Figure 5:
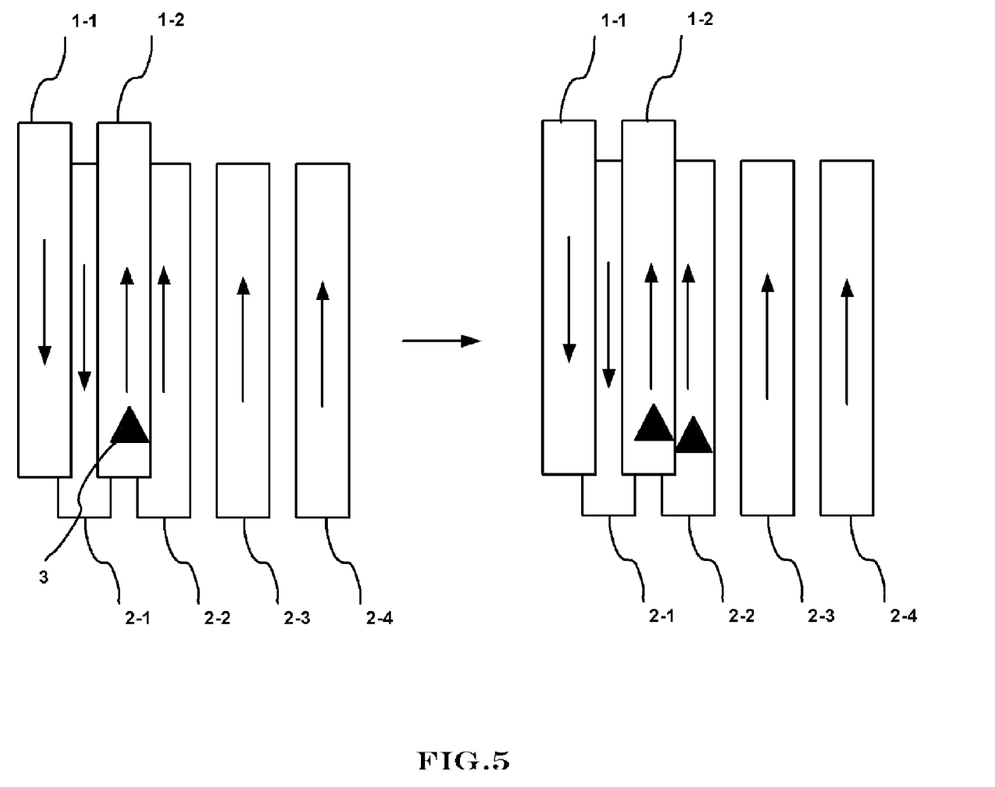
FIG. 5 illustrates a plurality of parallel roads for describing a method for correcting map matching according to an embodiment of the present invention.
Figure 6A:
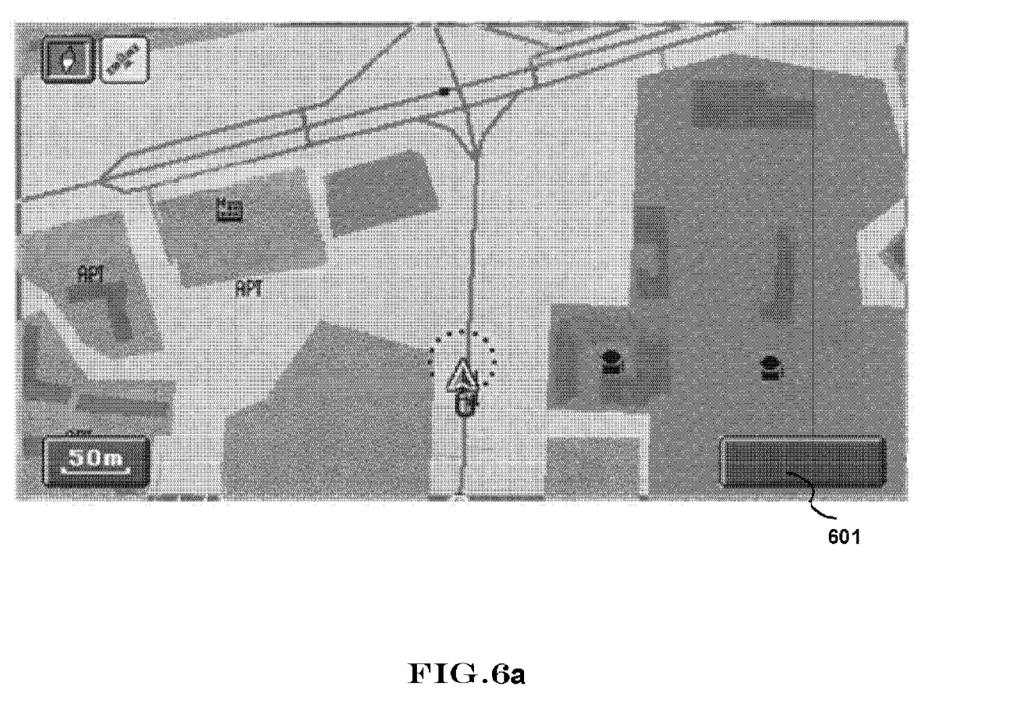
FIG. 6 illustrates an example of activating a map-matching correction button according to an embodiment of the present invention.
Figure 6B:
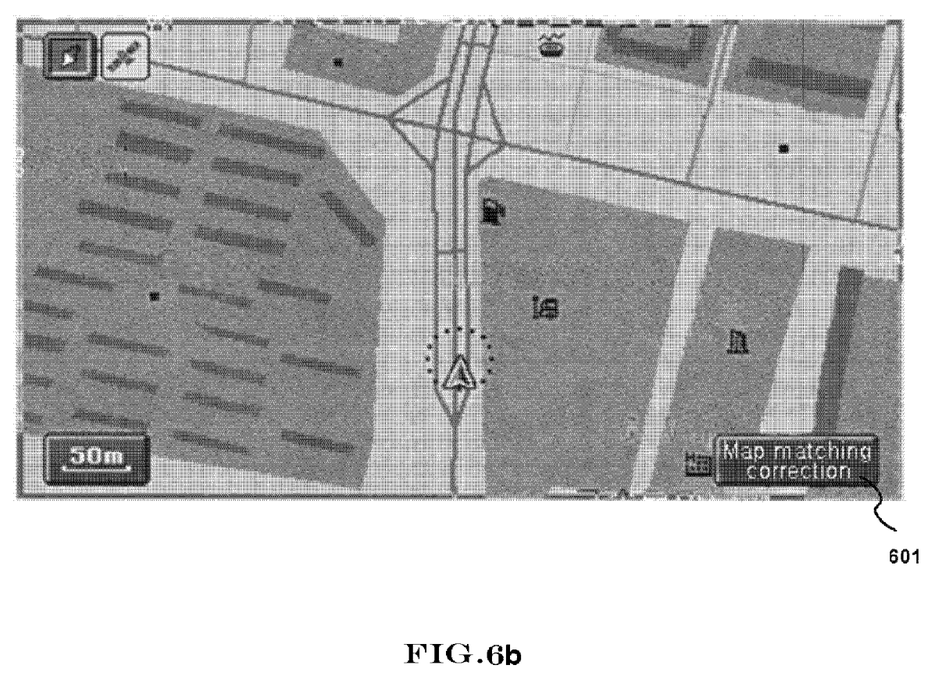

FIG. 2 is a flowchart illustrating a method for activating the map-matching correction button according to the present invention, FIG. 5 illustrates a plurality of parallel roads for describing a method for correcting map matching according to an embodiment of the present invention, and FIG. 6 illustrating an example of activating the map-matching correction button according to an embodiment of the present invention where FIG. 6A illustrates a case of deactivating the map-matching correction button 601, and FIG. 6B illustrates a case of activating the map-matching correction button 601. Hereinafter, a description will be made with reference to FIGS. 1, 2, 5, and 6.

In Step 211, the controller 10 measures the self position and driving direction through the GPS module 60, matches the measured position and driving direction to the map data, and displays the matched result on the display unit 50.

Upon displaying of the map data, in Step 213, the controller 10 searches for a parallel road existing within a predetermined distance (Am) from a road of the map-matched current position with reference to the map data. In case where a vehicle is positioned in an area where a plurality of the roads are arrayed as in FIG. 5, roads having opposite driving directions to the current driving direction 3, that is, an overpass road 1-1 and a general road 2-1 of FIG. 5 are excluded from the searching.

After the searching, in Step 215, the controller 10 determines whether or not the searched roads are 2 or more in number.

If the searched roads are determined to be 2 or more in number, in Step 217, the controller 10 prepares or updates a candidate road array. As shown in FIG. 5, the candidate road array is indexed in a sequence of a leftmost road 2-1 to a rightmost road 2-4 and, if the overpass road 1 is overlapped with the general road 2, the candidate road array is indexed in a sequence of an uppermost road 1 to a lowermost road 2. In other words, front numerals denote upper and lower roads, and rear numerals denote roads on the same layer. The candidate road array performs real-time dynamic updating depending on a road circumstance.

Upon preparing of the candidate road array in the Step 217, in Step 219, the controller 10 activates the map-matching correction button as in FIG. 6B, and returns to the Step 211 and repeatedly performs the subsequent steps.

However, if the searched roads are less than 2 in number, in Step 221, the controller 10 deactivates the map-matching correction button 601 as in FIG. 6A, and returns to the Step 211 and repeatedly performs the subsequent steps. Through the Step 221, the map-matching correction button being in a previous activated state is deactivated. FIG. 6A illustrates a case of activating or deactivating only a word displayed on the map-matching correction button 601, but can also employ a case where, when the word is deactivated, the map-matching correction button 601 itself is deactivated, and only when the words are activated, the map-matching correction button 601 is activated.

Figure 3:
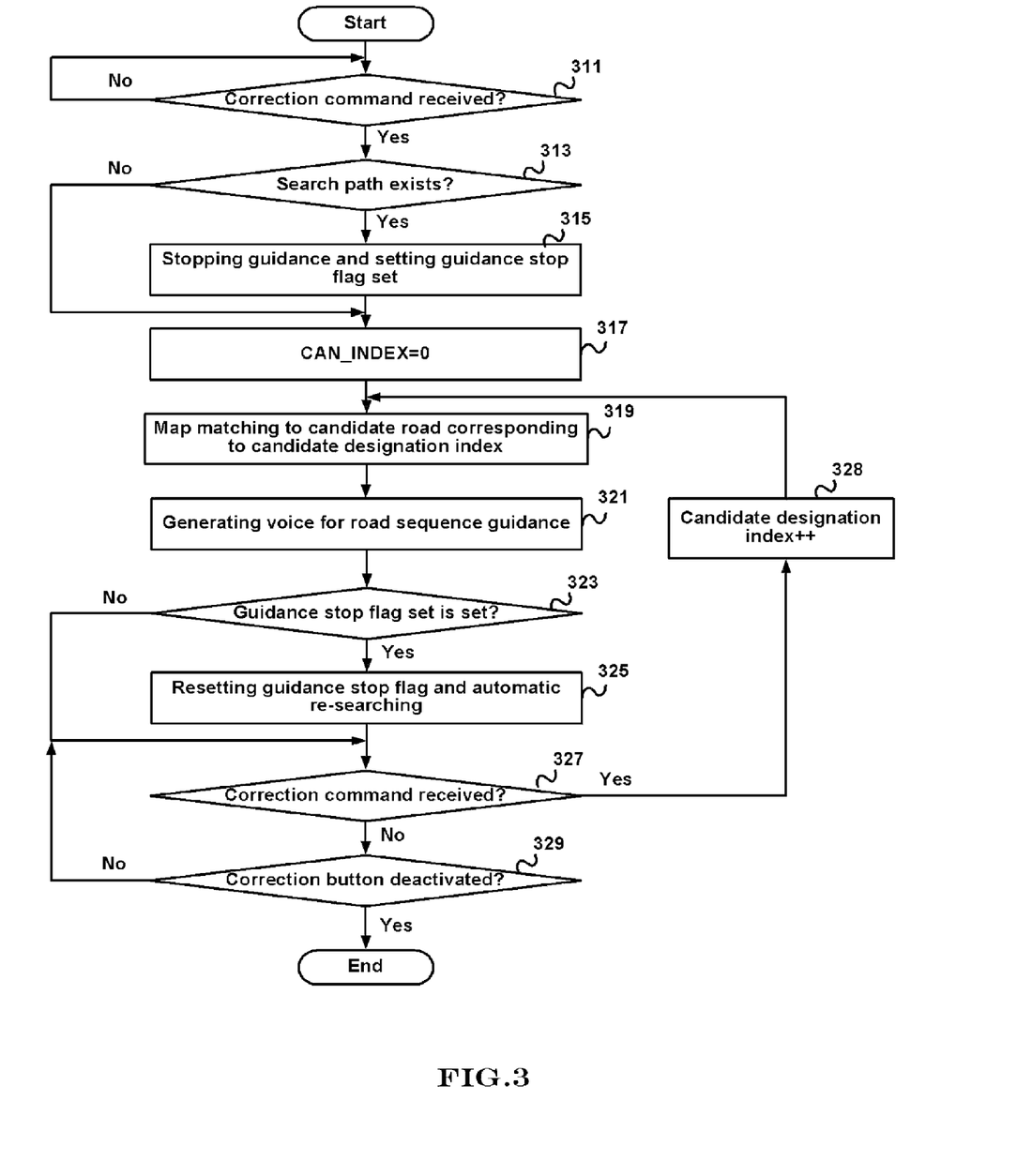
FIG. 3 is a flowchart illustrating a method for correcting map matching in a navigation system according to the first embodiment of the present invention.

FIG. 3 is a flowchart illustrating a method for correcting map matching in the navigation system according to the first embodiment of the present invention. A description will be made with reference to FIG. 3.

The method of FIG. 3 is performed when the map-matching correction button is activated through the method of FIG. 2. If the map-matching correction button is activated through the method of FIG. 2, in Step 311, the controller 10 determines whether or not to receive key data corresponding to a command for correcting the map matching, or a coordinate value of a position where the map-matching correction button of FIG. 6 is activated (Hereinafter, referred to as "map matching correction command"), from the input unit 40 or the display unit 50.

Upon receipt of the map matching correction command in the Step 311, in Step 313, the controller 10 determines whether or not there currently exists the searched path for the road guidance.

If it is determined as the determination result that the searched path exists, in Step 315, the controller 10 sets (or resets) the guidance stop flag of the storage unit 20, and proceeds with Step 317. On the contrary, if it is determined that the searched path does not exist, the controller 10 directly proceeds with the Step 317.

In the Step 317, the controller 10 performs initialization of the candidate designation index (CAN_INDEX=0), and proceeds with Step 319.

In the Step 319, the controller 10 performs the map matching correction for the candidate road corresponding to the candidate designation index. For example, since the candidate designation index is initially zero, the map matching correction is performed for a road belonging to a candidate road array corresponding to zero.

Upon execution of the map matching correction, in Step 321, the controller 10 reads the voice data for the road sequence guidance, and outputs the read voice data by the audible sound through the audio processor 70 and the speaker.

After outputting of the voice data for the road sequence guidance, in Step 323, the controller 10 determines whether or not the guidance stop flag is set to "set" (or "reset").

If it is determined to set the guidance stop flag to the "set", in Step 325, the controller 10 resets (or sets) the guidance stop flag and performs an automatic path re-search.

After that, in Step 327, the controller 10 determines whether or not to receive the map matching correction command.

Upon receipt of the map matching correction command, in Step 328, the controller 10 increases a value of the candidate designation index by 1, returns to the Step 319 to perform the map matching correction for the road belonging to the candidate road array corresponding to the candidate designation index, and repeatedly performs the Steps 321 to 327. In other words, whenever a map-matching correction key is pressed on the input unit 40 or the map-matching correction button is pressed on the display unit 50, the map matching correction is sequentially performed in the sequence of the leftmost road 2-1 to the rightmost road 2-4 and, if the overpass road is overlapped with the general road, it is sequentially performed in the sequence of the uppermost road 1 to the lowermost road 2.

However, if the map-matching correction command is not inputted in the Step 327, the controller 10 periodically proceeds with Step 329, and determines whether or not the map-matching correction button is deactivated.

If the map-matching correction button is deactivated through the Step 221 of FIG. 2, in the Step 329, the controller 10 recognizes deactivation of the map-matching correction button and terminates a procedure.

Figure 4:
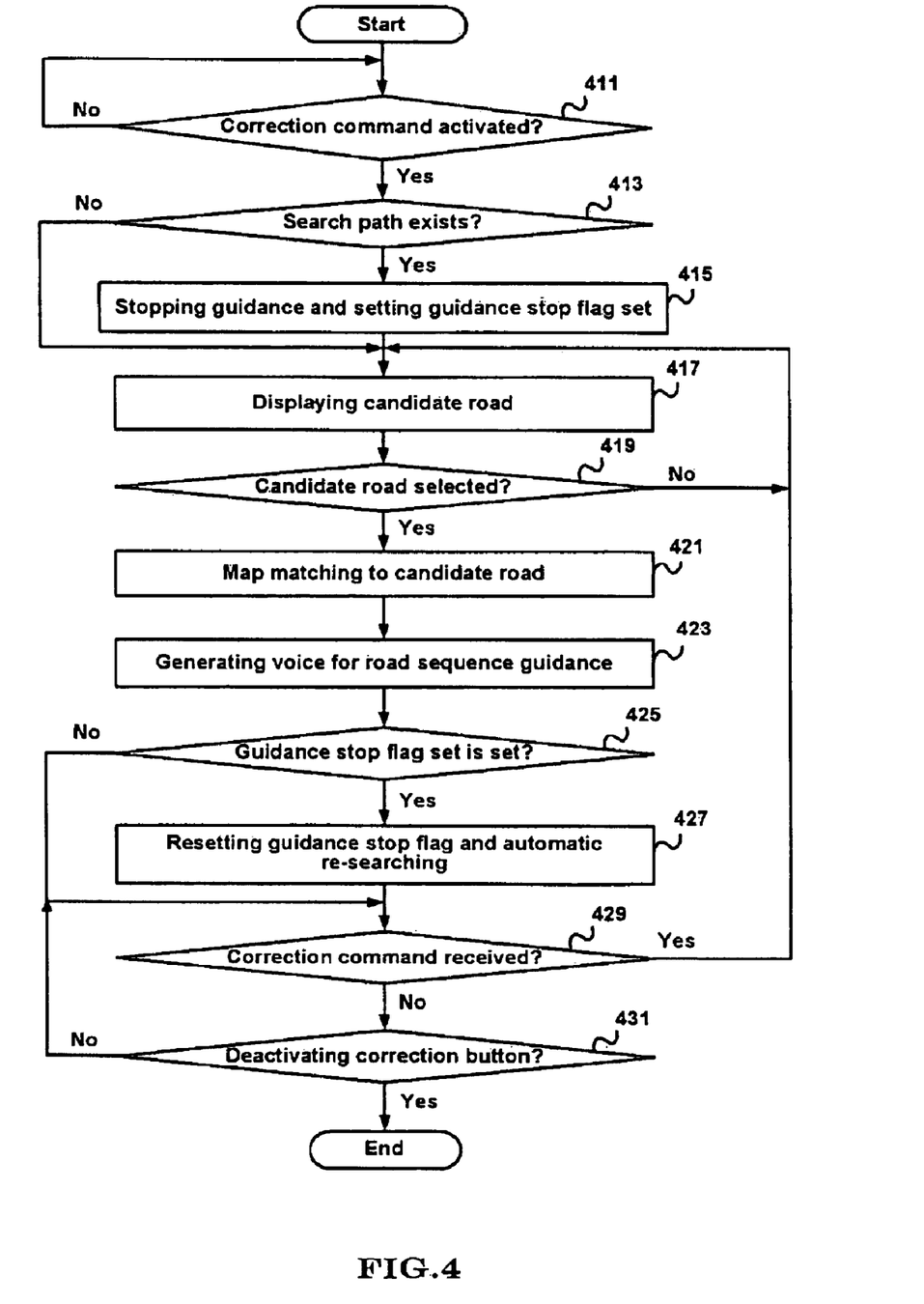
FIG. 4 is a flowchart illustrating a method for correcting map matching in a navigation system according to the second embodiment of the present invention.

FIG. 4 is a flowchart illustrating a method for correcting map matching in a navigation system according to the second embodiment of the present invention. A description will be made with reference to FIGS. 1 to 6 below.

The method of FIG. 4 is performed when a map-matching correction button is activated through the method of FIG. 2. If a map-matching correction button is activated through the method of FIG. 2, in Step 411, a controller 10 determines whether or not to receive a map matching correction command from an input unit 40 or a display unit 50.

Upon receipt of the map matching correction command in the Step 411, in Step 413, the controller 10 determines whether or not there currently exists a searched path for road guidance.

If it is determined as the determination result that the searched path exists, in Step 415, the controller 10 sets (or resets) a guidance stop flag of a storage unit 20, and proceeds with Step 417. On the contrary, if it is determined that the searched path does not exist, the controller 10 directly proceeds with the Step 417.

In the Step 417, the controller 10 displays the candidate roads of FIG. 5 on the display unit 50. Together with this, numbers can be also displayed in positions corresponding to the respective roads of FIG. 5, in a sequence of the left to the right and in a sequence of an overpass road to a general road.

If candidate roads are displayed on the display unit 50 as aforementioned, in Step 419, the controller 10 determines whether or not one of the candidate roads is selected. The candidate road can be selected to be a map-matching corrected road, by moving an arrow to a corresponding candidate road using a selection key of the input unit 40 and pressing a map-matching correction key. In the case of using a touch screen, the user can touch and select the road to be map-matched, on a screen.

If the candidate road is selected in the Step 419, in Step 421, the controller 10 corrects a calculated position 3 into a position 4 of the candidate road, thereby performing the map matching correction as in FIG. 5.

After the map matching correction is performed, in Step 423, the controller 10 outputs a road sequence guidance voice for the selected road through an audio processor 70. For example, in case where the overpass road 1-2, the general road 2-2, the general road 2-3, and the general road 2-4 exclusive of the road having the opposite driving direction each are indexed to index numbers of 1, 2, 3, and 4 with an overpass priority and a left priority, the general road 2-2 of FIG. 5 is selected and the map-matching correction is performed. Accordingly, the controller 10 outputs the voice data for the road sequence guidance including the index number, that is, the voice data of "Map matching correction for 2-numbered candidate road is executed" by an audible sound through the audio processor 70 and the speaker.

After outputting of the road sequence guidance voice, in Step 425, the controller 10 determines whether or not the guidance stop flag is set to the "set" (or "reset").

If it is determined to set the guidance stop flag to the "set", in Step 427, the controller 10 resets (or sets) the guidance stop flag and performs an automatic path re-search.

After that, in Step 429, the controller 10 determines whether or not to receive the map matching correction command.

Upon receipt of the map matching correction command, in Step 417, the controller 10 displays the parallel candidate roads on the display unit 50 as in FIG. 5, and repeatedly performs the Steps 419 to 429. In other words, whenever the map-matching correction key is pressed on the input unit 40 or the map-matching correction button is pressed on the display unit 50, the user can directly reselect the road and perform the map matching correction.

However, if the correction command is not received in the Step 429, in Step 431, the controller 10 periodically proceeds with Step 431, and determines whether or not the map-matching correction button is deactivated. Upon deactivating of the map-matching correction button, the controller 10 terminates a procedure, and repeatedly performs the Steps 327 and 329.

As described above, the present invention has an advantage in that, since the user (for example, a driver) can activate the one-touch button or key and perform the map matching correction at the position of the area where the roads are arrayed in parallel, erroneous path search and guidance can be reduced.

Accordingly, the present invention is advantageous of preventing a user's confusion caused by erroneous map matching.

While the present invention has been described with reference to exemplary embodiments thereof, it will be apparent to those skilled in the art that various modifications can be made therein without departing from the spirit and scope of the invention as defined by the appended claims and their equivalents.

What is claimed is:

1. A navigation system with a function of map matching correction, for matching self position and driving direction to map data and displaying the map-matched position and direction, the system comprising:
   a GPS module configured for receiving each position signal from a plurality of GPS satellites, measuring the self position and driving direction, and outputting information on the measured position and direction;
   a map database configured for storing the map data;
   a storage unit configured for storing a candidate designation index, road information corresponding to the candidate designation index, a guidance stop flag, a flag activating a map-matching correction button, and voice data for road sequence guidance;
   a display unit configured for, under a predetermined control, displaying the map data, activating or deactivating the map-matching correction button, magnifying and displaying candidate roads, and generating a coordinate value of a position on a screen pressed by an external force; and
   a controller configured for, when there are one or more parallel roads within a predetermined distance from a road of the map-matched position, indexing the parallel roads, generating a candidate road array for storing information on roads including a road of the map-matched position according to an indexing sequence, activating the map-matching correction button, and sequentially selecting candidate roads of the candidate road array depending on the number of times of pressing the map-matching correction button while performing the map matching correction.

2. The system according to claim 1, wherein the candidate road array stores the indexing sequence in a sequence of left to right on an orientation of an observer's right and left.

3. The system according to claim 2, wherein the candidate road array stores the indexing sequence in a sequence of an uppermost road to a lowermost road when a general road and an overpass road are overlapped.

4. The system according to claim 1, further comprising an audio processor for outputting a road sequence guidance voice for the map-matching corrected road under the control of the controller.

5. A navigation system with a function of map matching correction, for matching self position and driving direction to map data and displaying the map-matched position and direction, the system comprising:
   a GPS module configured for receiving each position signal from a plurality of GPS satellites, measuring the self position and driving direction, and outputting information on the measured position and direction;
   a map database configured for storing the map data;
   a storage unit configured for storing a candidate designation index, road information corresponding to the candidate designation index, a guidance stop flag, a flag activating a map-matching correction button, and voice data for road sequence guidance;

a display unit configured for, under a predetermined control, displaying the map data, activating or deactivating the map-matching correction button, magnifying and displaying candidate roads, and generating a coordinate value of a position on a screen pressed by an external force; and a controller configured for, when there are one or more parallel roads within a predetermined distance from a road of the map-matched position, indexing the parallel roads, generating in the storage unit a candidate road array for storing information on roads including a road of the map-matched position according to an indexing sequence, activating the map-matching correction button, and when the map-matching correction button is pressed, displaying the candidate roads on the display unit, receiving a coordinate value of one of the displayed candidate roads pressed by a user from the display unit, and performing the map matching correction.

6. The system according to claim 5, wherein the candidate road array stores the indexing sequence in a sequence of the left to the right.

7. The system according to claim 6, wherein the candidate road array stores the indexing sequence in a sequence of an uppermost road to a lowermost road when a general road and an overpass road are overlapped.

8. The system according to claim 5, further comprising an audio processor configured for outputting a road sequence guidance voice for the map-matching corrected road under the control of the controller.

9. A method of correcting map matching in a navigation system having a function of map matching correction, the method comprising the steps of:

measuring a current position and, when there are one or more parallel roads within a predetermined distance from a road of the measured position, preparing an array for storing indexes for and information on the road of the measured position and the parallel roads and corresponding to the stored indexes, and activating a map-matching correction button; and sequentially moving a selection of the roads according to an indexing sequence by the number of times of pressing the map-matching correction button, while performing the map matching correction.

10. A method of correcting map matching in a navigation system having a function of map matching correction, the method comprising the steps of:

measuring a current position and, when there are one or more parallel roads within a predetermined distance from a road of the measured position, preparing a candidate road array for storing indexes for and information on the road of the measured position and the parallel roads and corresponding to the stored indexes, and activating a map-matching correction button; and when the map-matching correction button is pressed, displaying candidate roads, and performing the map matching correction for the candidate road selected by a user from the displayed candidate roads.

* * * * *